US011973267B2

(12) United States Patent
Li et al.

(10) Patent No.: US 11,973,267 B2
(45) Date of Patent: Apr. 30, 2024

(54) ANTENNA AND COMMUNICATION APPARATUS

(71) Applicants: Beijing BOE Technology Development Co., Ltd., Beijing (CN); BOE TECHNOLOGY GROUP CO., LTD., Beijing (CN)

(72) Inventors: Chunxin Li, Beijing (CN); Jia Fang, Beijing (CN); Yang Zheng, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 234 days.

(21) Appl. No.: 17/621,217

(22) PCT Filed: Jan. 29, 2021

(86) PCT No.: PCT/CN2021/074275
§ 371 (c)(1),
(2) Date: Dec. 20, 2021

(87) PCT Pub. No.: WO2022/160224
PCT Pub. Date: Aug. 4, 2022

(65) Prior Publication Data

US 2023/0155294 A1 May 18, 2023

(51) Int. Cl.
*H01Q 13/10* (2006.01)
*H01Q 1/38* (2006.01)
*H01Q 3/34* (2006.01)

(52) U.S. Cl.
CPC ............... *H01Q 13/10* (2013.01); *H01Q 1/38* (2013.01); *H01Q 3/34* (2013.01)

(58) Field of Classification Search
CPC ............ H01Q 13/10; H01Q 1/38; H01Q 3/34; H01Q 3/247; H01Q 21/0012; H01Q 21/0031; H01Q 21/064
See application file for complete search history.

(56) References Cited

U.S. PATENT DOCUMENTS 6,069,587 A * 5/2000 Lynch .................. H01Q 9/0407 343/702
2004/0214605 A1* 10/2004 Zhang .................... H01Q 9/145 455/562.1
2005/0178646 A1 8/2005 De Los Santos

FOREIGN PATENT DOCUMENTS

CN 101246981 A 8/2008
CN 101499551 A 8/2009
(Continued)

*Primary Examiner* — Seung H Lee
(74) *Attorney, Agent, or Firm* — HOUTTEMAN LAW LLC

(57) ABSTRACT

An antenna includes: a dielectric layer having first and second surfaces opposite to each other; a radiating layer on the first surface, and having therein a slit; a first shielding layer on the second surface, and being electrically connected to the radiating layer; a first insulating layer on an upper side of the radiating layer; and a switch unit on an upper side of the first insulating layer, and corresponding to the slit. Each switch unit includes: a first electrode, a second insulating layer, a connecting portion, and a second electrode on the first insulating layer sequentially. Orthogonal projections of the first and second electrodes on the dielectric layer overlap each other. The connecting portion is connected to the second electrode to form a gap between the first and second electrodes. Orthogonal projections of the second electrode and a corresponding slit on the dielectric layer overlap each other.

20 Claims, 3 Drawing Sheets

(56) References Cited

FOREIGN PATENT DOCUMENTS

| | | | |
|---|---|---|---|
| CN | 111697341 | A | 9/2020 |
| WO | WO 2012155284 | A1 | 11/2012 |

* cited by examiner

ANTENNA AND COMMUNICATION APPARATUS

CROSS REFERENCE TO RELATED APPLICATIONS

This is a National Phase Application filed under 35 U.S.C. 371 as a national stage of PCT/CN2021/074275 filed on Jan. 29, 2021, the content of which is incorporated herein by reference in its entirety.

TECHNICAL FIELD

The present disclosure relates to the field of communication technology, and in particular, to an antenna and a communication apparatus.

BACKGROUND

A radial line slot antenna has the advantages of small loss of a waveguide slot array, simple structure of a microstrip antenna, and low profile, and thus, is widely applied to millimeter wave microwave systems. Generally, the radial line slot antenna is composed of an upper metal plate and a lower metal plate that have therebetween a distance less than ½ wavelengths, to form a radial waveguide, and designed slots are formed in the upper metal plate, so that any polarization mode or radiation characteristic can be realized.

SUMMARY

Embodiments of the present disclosure provide an antenna and a communication apparatus.

In a first aspect, embodiments of the present disclosure provide an antenna, which includes:

a dielectric layer having a first surface and a second surface opposite to each other in a thickness direction of the dielectric layer;

a radiating layer on the first surface of the dielectric layer, and having therein at least one slit;

a first shielding layer on the second surface of the dielectric layer, and being electrically connected to the radiating layer;

wherein the antenna further includes:

a first insulating layer on a side of the radiating layer distal to the first surface of the dielectric layer;

at least one switch unit on a side of the first insulating layer distal to the dielectric layer, and being in one-to-one correspondence with the at least one slit; and each switch unit includes: a first electrode, a second insulating layer, at least one connecting portion, and a second electrode that are sequentially arranged in a direction away from the first insulating layer, wherein an orthogonal projection of the first electrode on the dielectric layer and an orthogonal projection of the second electrode on the dielectric layer overlap each other, the at least one connecting portion is connected to the second electrode to form a certain gap between the second electrode and the first electrode, and the orthogonal projection of the second electrode on the dielectric layer and an orthogonal projection of a corresponding slit on the dielectric layer at least partially overlap each other.

In an embodiment, the orthogonal projection of the second electrode on the dielectric layer covers a center of the orthogonal projection of the corresponding slit on the dielectric layer.

In an embodiment, the first electrode includes a first sub-electrode and a second sub-electrode, and orthogonal projections of the first sub-electrode and the second sub-electrode on the dielectric layer are respectively on both sides, which are along a lengthwise direction of the orthogonal projection of the corresponding slit on the dielectric layer, of the orthogonal projection of the corresponding slit on the dielectric layer, and the at least one connecting portion is on a portion of the second insulating layer on at least one of the first sub-electrode and the second sub-electrode of each switch unit.

In an embodiment, each switch unit includes two connecting portions, the two connecting portions are respectively connected to two opposite ends of the second electrode in a lengthwise direction of the second electrode, and the lengthwise direction of the second electrode in each switch unit intersects with a lengthwise direction of the slit corresponding to the switch unit.

In an embodiment, each switch unit includes one connecting portion connected to one end of the second electrode in a lengthwise direction of the second electrode, and the lengthwise direction of the second electrode in each switch unit intersects with a lengthwise direction of the slit corresponding to the switch unit.

In an embodiment, the dielectric layer includes a first sub-dielectric layer and a second sub-dielectric layer, a surface of the first sub-dielectric layer distal to the second sub-dielectric layer serves as the first surface of the dielectric layer, a surface of the second sub-dielectric layer distal to the first sub-dielectric layer serves as the second surface of the dielectric layer, the antenna further includes a second shielding layer between the first sub-dielectric layer and the second sub-dielectric layer, and an edge of an orthogonal projection of the second shielding layer on the first sub-dielectric layer and a corresponding edge of an orthogonal projection of the first shielding layer on the first sub-dielectric layer have a certain distance therebetween.

In an embodiment, an orthogonal projection of a center of the first shielding layer on the first sub-dielectric layer and an orthogonal projection of a center of the second shielding layer on the first sub-dielectric layer overlap each other.

In an embodiment, the at least one slit includes a plurality of slits, and the plurality of slits are arranged to form one of the following:

a spiral shape;

concentric circles; and a linear shape.

In an embodiment, the antenna further includes a feeding element for feeding an electromagnetic wave signal into the dielectric layer, and a feeding point of the feeding element is at a center of the radiating layer.

In an embodiment, the dielectric layer includes a material of glass.

In a second aspect, embodiments of the present disclosure provide a communication apparatus, which includes the antenna according to any one of the foregoing embodiments.

DETAILED DESCRIPTION

To enable one or ordinary skill in the art to better understand technical solutions of the present disclosure, the present disclosure will be further described in detail below with reference to the accompanying drawings and exemplary embodiments.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

It should be noted that a structure of an antenna according to an embodiment of the present disclosure includes, but is not limited to, a cylinder, a rectangular parallelepiped, a cube, or the like. In the following description of an embodiment, the structure of a slot antenna is exemplified as a cylinder. In an embodiment of the present disclosure, a material of a dielectric layer of the slot antenna includes, but is not limited to, glass, i.e., the dielectric layer may be made of glass. In fact, the material of the dielectric layer may alternatively be any insulating material capable of forming a structure with a flat surface, such as quartz, polyimide, transparent optical adhesive, or the like. Further, a dielectric constant of the dielectric layer is not limited, and an adopted thickness of the dielectric layer depends on the dielectric constant and an operating frequency of the antenna. In the following embodiments, description will be made by taking an example in which the dielectric layer is a glass dielectric layer, but this is not intended to limit the scope of the embodiments of the present disclosure.

Figure 1:
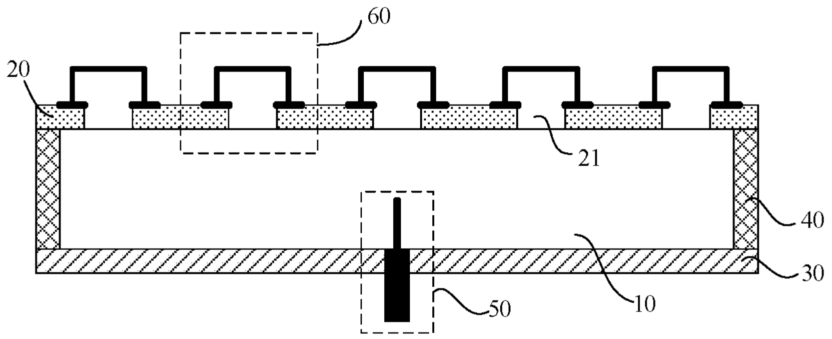
FIG. 1 is a schematic diagram showing an antenna according to an embodiment of the present disclosure.
Figure 2:
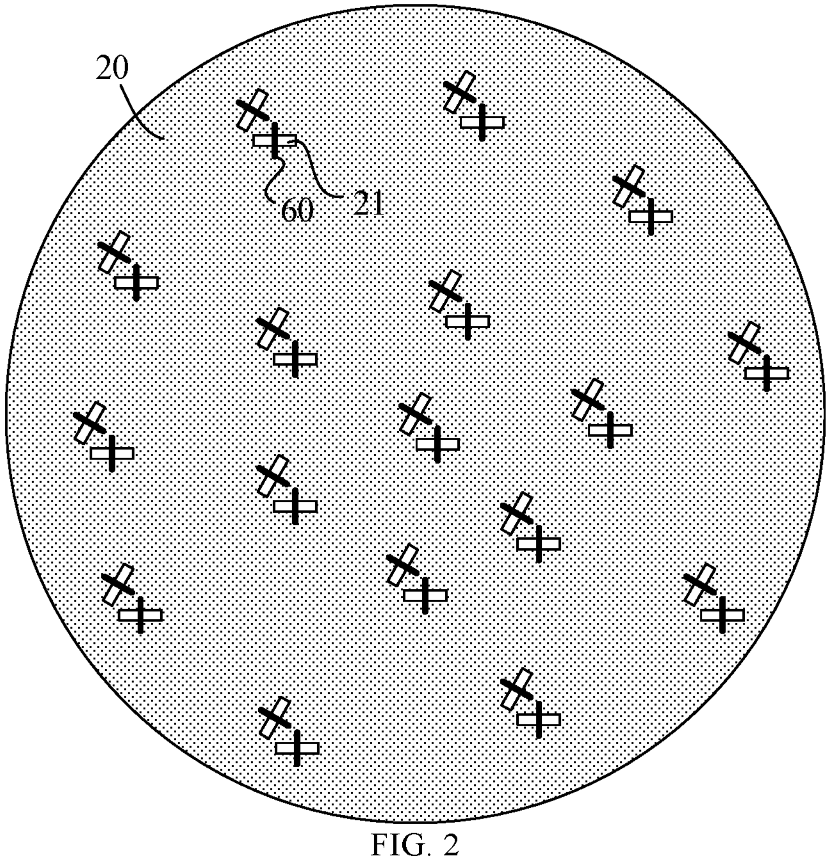
FIG. 2 is a top view of the antenna shown in FIG. 1.
Figure 3:
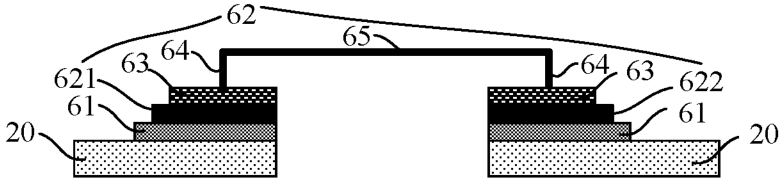
FIG. 3 is a schematic diagram showing a turn-on state of a switch unit according to an embodiment of the present disclosure.
Figure 4:
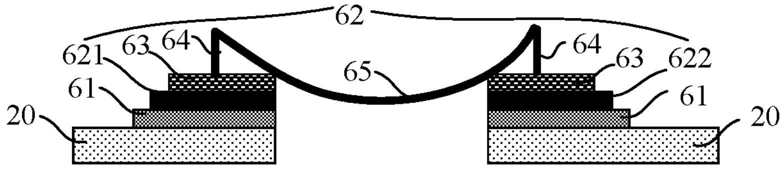
FIG. 4 is a schematic diagram showing a turn-off state of a switch unit according to an embodiment of the present disclosure.

In a first aspect, an embodiment of the present disclosure provides an antenna, and FIG. 1 is a schematic diagram showing the antenna according to the present embodiment. FIG. 2 is a top view of the antenna shown in FIG. 1. FIG. 3 is a schematic diagram showing a turn-on state of a switch unit 60 according to the present embodiment, and FIG. 4 is a schematic diagram showing a turn-off state of the switch unit 60 according to the present embodiment. As shown in FIGS. 1 to 4, the antenna includes a dielectric layer 10, a first shielding layer 30, a radiating layer 20, a first insulating layer 61, and at least one switch. The dielectric layer 10 includes a first surface and a second surface opposite to each other, the first surface being an upper surface of the dielectric layer 10 in FIG. 1, and the second surface being a lower surface of the dielectric layer 10 in FIG. 1. The radiating layer 20 is arranged on the first surface of the dielectric layer 10, and is provided with at least one slit (or slot) 21 therein. The first shielding layer 30 is disposed on the second surface of the dielectric layer 10, and is electrically connected to the radiating layer 20 disposed on the first surface of the dielectric layer 10. One switch unit 60 in the present embodiment may be disposed corresponding to one slit 21, and for example, switch units 60 are disposed to be in one-to-one correspondence with slits 21. Each switch unit 60 may include a first electrode 62, a second insulating layer 63, at least one connecting portion 64, and a second electrode 65, which are sequentially disposed along a direction away from the first insulating layer 61. For example, an orthogonal projection of the first electrode 62 on the dielectric layer 10 and an orthogonal projection of the second electrode 65 on the dielectric layer 10 overlap each other. Each connecting portion 64 is connected to the second electrode 65 such that a certain gap (or distance) exists between the second electrode 65 and the first electrode 62. An orthogonal projection of the second electrode 65 on the dielectric layer 10 at least partially overlaps an orthogonal projection of a corresponding slit 21 on the dielectric layer 10. Optionally, the antenna including slits 21 (i.e., slot antenna) further includes a feeding element 50 and the like, and the feeding element 50 is for feeding an electromagnetic wave into the dielectric layer 10 through the first shielding layer 30.

It should be noted that, the first shielding layer 30 and the radiating layer 20 may be electrically connected to each other through a through hole penetrating through an edge region of the dielectric layer 10. The number of through holes 40 may be two or more, and the two or more through holes are spaced apart from each other.

Since one switch unit 60 is disposed on each slit 21 of the antenna according to the present embodiment, and a certain gap exists between the first electrode 62 and the second electrode 65 of each switch unit 60, when no voltage is applied across the first electrode 62 and the second electrode 65, the switch unit 60 is in a turn-on state as shown in FIG. 3, and a microwave signal fed into the dielectric layer by the feeding element 50 may be radiated out of the dielectric layer through the slit 21. When a direct current (DC) bias voltage is applied across the first electrode 62 and the second electrode 65, the second electrode 65 is pulled down to a surface of the corresponding slit 21 under the action of static electricity, and at this time, the switch unit 60 is in a turn-off state as shown in FIG. 4. In this case, a microwave signal fed into the dielectric layer by the feeding element 50 cannot be radiated out of the dielectric layer, i.e., the switch serves as a shielding electrode. In addition, when the antenna includes a plurality of slits 21 and a plurality of switch units 60, a direct current bias voltage may be selectively applied across the first electrodes 62 and the second electrodes 65 of some of the switch units 60, so that a microwave signal may be radiated out of the dielectric layer through some of the slits 21, but cannot be radiated out of the dielectric layer through other of the slits 21, thereby adjusting a radiation direction of the microwave signal.

In some examples, the orthogonal projection of the second electrode 65 of each switch unit 60 on the dielectric layer 10 covers a center of the orthogonal projection of the corresponding slit 21 on the dielectric layer 10. In this case, when a direct current bias voltage is applied across the first electrode 62 and the second electrode 65 of each switch unit 60, the second electrode 65 is driven by an electrostatic force to cover the slit 21 to shield a microwave signal. It should be noted that, in general, the orthogonal projection of the second electrode 65 on the dielectric layer 10 may not completely cover the orthogonal projection of the corresponding slit 21 on the dielectric layer 10. A length of each slit 21 is generally much greater than a width of the corresponding second electrode 65.

In order to make the structure of each switch unit 60 according to an embodiment of the present disclosure more clear, two specific structures of each switch unit 60 will be described below.

In an example, each switch unit 60 is a MEMS (micro-electro-mechanical system) switch, and the first electrode 62 of each switch unit 60 includes a first sub-electrode 621 and a second sub-electrode 622. Further, an orthogonal projection of the first sub-electrode 621 on the dielectric layer and an orthogonal projection of the second sub-electrode 622 on the dielectric layer 10 are arranged on both sides of a lengthwise direction of the orthogonal projection of the corresponding slit 21 on the dielectric layer 10, respectively. Each switch unit 60 includes two connecting portions 64, which are respectively connected to two opposite ends of the corresponding second electrode 65 in a lengthwise direction of the corresponding second electrode 65. Further, one of the two connecting portions 64 is located on a portion of the second insulating layer 63 on the first sub-electrode 621, and the other of the two connecting portions 64 is located on a portion of the second insulating layer 63 on the second sub-electrode 622. In addition, an orthogonal projection of each of the first sub-electrode 621 and the second sub-electrode 622 on the dielectric layer 10 overlaps the orthogonal projection of the corresponding second electrode 65 on the dielectric layer 10. In some examples, the two connecting portions 64 and the corresponding second electrode 65 have a one-piece structure, and may be formed through a single patterning process.

Figure 5:
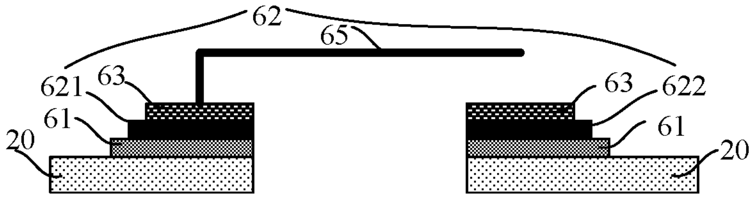
FIG. 5 is a schematic diagram showing a turn-on state of another switch unit according to an embodiment of the present disclosure.
Figure 6:
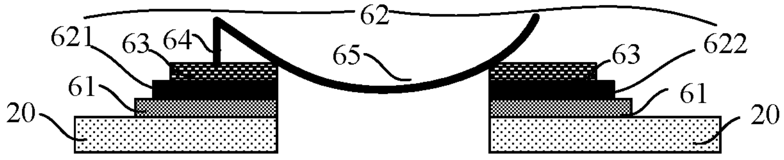
FIG. 6 is a schematic diagram showing a turn-off state of another switch unit according to an embodiment of the present disclosure.

In another example, FIG. 5 is a schematic diagram showing a turn-on state of another switch unit 60 according to an embodiment of the present disclosure. FIG. 6 is a schematic diagram showing a turn-off state of the another switch unit 60 according to an embodiment of the present disclosure. The switch unit 60 shown in FIGS. 5 and 6 is substantially the same as that shown in FIG. 3, except that the switch unit 60 shown in FIGS. 5 and 6 includes only one connecting portion 64, and other structures thereof are the same as those of the switch unit 60 shown in FIG. 3, thus detailed description thereof being omitted here.

It should be noted that, for the switch unit 60 shown in FIG. 5, the second insulating layer 63 and the first electrode 62 (which is, in particular, the second sub-electrode 622) may not be provided below an end, at which the connecting portion 64 is not provided, of the second electrode 65. In this case, as long as a direct current bias voltage applied across the first sub-electrode 621 and the second electrode 65 is controlled so that the switch unit 60 may be in a turn-off state as shown in FIG. 6, the second electrode 65 may also be driven by an electrostatic force to be in contact with the corresponding slit 21 in the radiating layer 20.

Figure 7:
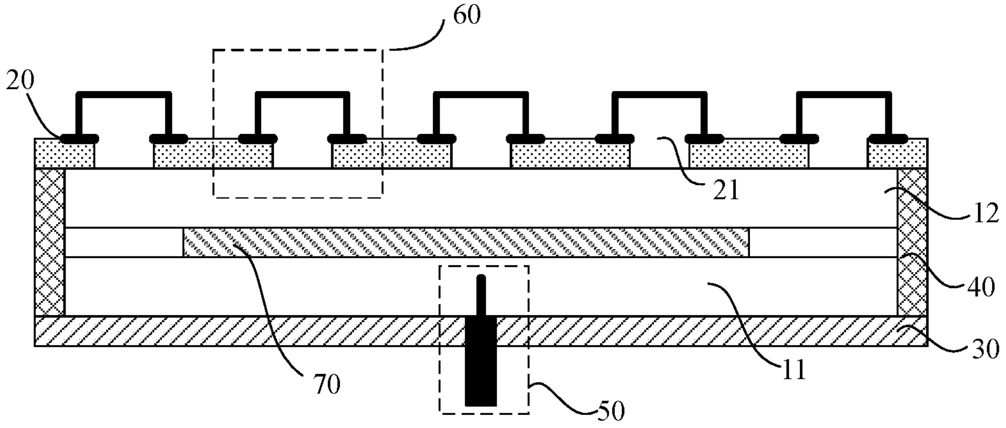
FIG. 7 is a schematic diagram showing another antenna according to an embodiment of the present disclosure.

In some examples, FIG. 7 is a schematic diagram showing another antenna according to an embodiment of the present disclosure. As shown in FIG. 7, a dielectric layer 10 of the antenna includes a first sub-dielectric layer 11 and a second sub-dielectric layer 12, and the antenna including slits 21 further includes a second shielding layer 70 disposed between the first sub-dielectric layer 11 and the second sub-dielectric layer 12. Further, an edge of an orthogonal projection of the second shielding layer 70 on the first sub-dielectric layer 11 and a corresponding edge of an orthogonal projection of the first shielding layer 30 on the first sub-dielectric layer 10 have a certain distance therebetween. For example, a surface of the first sub-dielectric layer 11 distal to the second sub-dielectric layer 12 serves as the first surface of the dielectric layer 10, and a surface of the second sub-dielectric layer 12 distal to the first sub-dielectric layer 11 serves as the second surface of the dielectric layer 10. The radiating layer 20 is formed on the surface of the second sub-dielectric layer 12 distal to the first sub-dielectric layer 11, and the first shielding layer 30 is formed on the surface of the first sub-dielectric layer 11 distal to the second sub-dielectric layer 12. The radiating layer 20 and the first shielding layer 30 are connected to each other through a through hole 40 penetrating through the first sub-dielectric layer 11 and the second sub-dielectric layer 12. The second shielding layer 70 may be formed on a surface of the first sub-dielectric layer 11 proximal to the second sub-dielectric layer 12, or on a surface of the second sub-dielectric layer 12 proximal to the first sub-dielectric layer 11. The following description will be made by taking an example in which the second shielding layer 70 is formed on the surface of the first sub-dielectric layer 11 proximal to the second sub-dielectric layer 12. Each through hole 40 in the first sub-dielectric layer 11 and the second sub-dielectric layer 12 may be formed as a TGV (e.g., through glass via), and may be metalized, i.e., a metal conductive layer may be formed on an inner wall of each through hole 40 or a metal may be filled in each through hole 40. The radiating layer 20 and the second shielding layer 70 may be formed on upper and lower surfaces of the first sub-dielectric layer 11 by using an electroplating process, respectively, and slits 21 in the radiating layer 20 may be formed by a patterning process. The first shielding layer 30 may be formed on a lower surface of the second sub-dielectric layer 12 by an electroplating process, and the first sub-dielectric layer 11 and the second sub-dielectric layer 12 may be aligned and assembled into a cell by a VAS (e.g., vacuum aligning technology), so as to result in a double-layer feeding layer with an extremely high alignment accuracy. The thickness of the dielectric layer 10 depends on the operating frequency of the antenna including slits 21, and the thickness of the dielectric layer 10 is selected to be smaller for a higher operating frequency of the antenna including slits 21. That is, in an embodiment of the present disclosure, a thickness of each of the first sub-dielectric layer 11 and the second sub-dielectric layer 12 of the dielectric layer 10 may be designed according to an operating frequency of the antenna including slits 21. In an embodiment of the present disclosure, each of the first sub-dielectric layer 11 and the second sub-dielectric layer 12 may be single-layer glass or multi-layer glass.

In the antenna including slits 21 with such a structure, there is no electrical connection between the second shielding layer 70 and any through hole 40, and the second shielding layer 70 mainly serves as making an electromagnetic wave fed into the dielectric layer 10 be distributed uniformly. Specifically, an electromagnetic wave fed by the feeding element 50 enters into the first sub-dielectric layer 11, propagates from a center line of the first sub-dielectric layer 11 along a radial direction of the antenna including slits 21, and then propagates to the second sub-dielectric layer 12 from an edge of the second shielding layer 70. That is, the electromagnetic wave propagates from a center to an edge of the first sub-dielectric layer 11, propagates from an edge to a center of the second sub-dielectric layer 12, and then is radiated out of the dielectric layer through the slits 21 in the radiating layer 20. In this way, the transmission and radiation of the electromagnetic wave is more uniform.

In some examples, the radiating layer 20 may have therein a plurality of slits 21, and the plurality of slits 21 may be arranged in a plurality of loops (or turns or rings or circles). Further, the slits 21 in each loop are uniformly spaced apart from each other, and a distance between any adjacent two of the plurality of loops is a constant. As such, a electromagnetic wave radiated by the antenna including slits 21 according to an embodiment of the present disclosure is distributed uniformly. It should be noted that, as shown in FIG. 2, in an embodiment of the present disclosure, the structure of the slot antenna is exemplified as a cylinder, and therefore, the slits 21 in each loop are arranged on a circle (or arranged to form a circle). If the slot antenna has a structure of a cube, the slits 21 in each loop may be arranged on a square (or arranged to form a square). Alternatively, as shown in FIG. 2, the radiating layer 20 may have a shape of a circle, and the slits 21 in each loop are arranged on a circle (or arranged to form a circle), while a profile of an edge of the radiating layer 20 may be a square. That is, a shape of the profile of the antenna including slits 21 may be different from a shape of a radiation area, i.e., may be different from a shape formed by the arrangement of the slits 21 in each loop in the radiation area.

It should be noted that, a shape of each slit 21 is not limited in an embodiment of the present disclosure, and includes, but is not limited to, a linear shape or the like.

In addition, the plurality loops of slits 21 are concentrically arranged, and a feeding point of the feeding element 50 corresponds to a center of the plurality loops of slits 21. Such an arrangement can result in more uniform radiation of an electromagnetic wave.

In some examples, the radiating layer 20 have therein a plurality of slits 21, and the plurality of slits 21 are arranged in a spiral shape (or arranged to from a spiral shape). Further, a distance between any adjacent two of the plurality of slits 21 is constant along an arrangement direction of the plurality of slits 21 (or along a direction in which the plurality of slits 21 are arranged). It should be noted that, in a case where the plurality of slits 21 are arranged in a spiral shape, the arrangement direction of the plurality of slits 21 refers to a direction of a curve formed by successively connecting centers of the plurality of slits 21 together. As such, an electromagnetic wave radiated from the antenna including slits 21 according to the present embodiment is distributed uniformly.

In some embodiments, the feeding point of the feeding element 50 is located at a center of the first shielding layer 30, which facilitates uniform radiation of an electromagnetic wave.

In some examples, the thickness of the dielectric layer 10 ranges from about 100 μm to about 10 mm, and depends on the dielectric constant of the dielectric layer 10 and the operating frequency of the antenna.

In some examples, the feeding element 50 may be a probe. An opening is disposed in the first shielding layer 30, and a half-hole (or semi-hole) is formed in the dielectric layer 10 at a position corresponding to the opening. The probe is fed into the half-hole of the dielectric layer 10 through the opening in the first shielding layer 30, and the feeding element 50 is connected to the first shielding layer 30 by welding.

Figure 8:
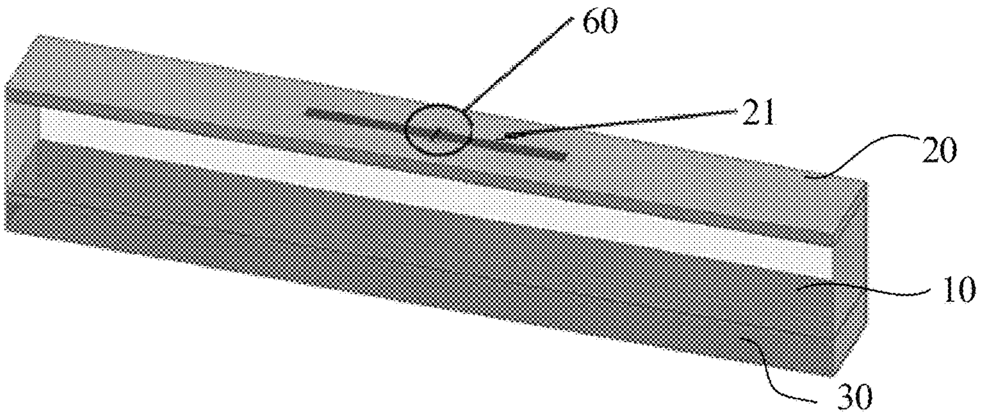
FIG. 8 is a schematic diagram showing a simulation of a switch unit of the antenna shown in each of FIGS. 1 to 7.

For the antenna shown in each of FIGS. 1 to 7, since the slits 21 of the antenna are arranged to form concentric circles or a spiral shape, and the feeding element 50 feeds power upwards from the first shielding layer 30, the antenna is a two-dimensional scanning antenna. FIG. 8 is a schematic diagram showing a simulation of one switch unit 60 in the antenna shown in each of FIGS. 1 to 7, and the result (which is optional) of the simulation is as follows. When the switch unit 60 is in a turn-on state, i.e., a certain gap exists between the first electrode 62 and the second electrode 65, the antenna can achieve a gain of −7.89 dB. When the switch unit 60 is in a turn-off state, i.e., the first electrode 62 is in contact with the corresponding slit 21 in the radiating layer 20, the antenna can achieve a gain of −15.88 dB. The result indicates that the radiation and shielding of a microwave can be achieved by controlling the state of the switch unit 60.

Figure 9:
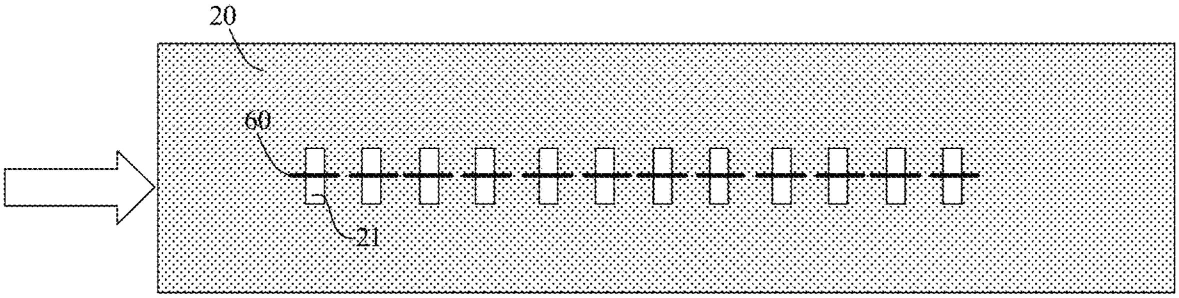
FIG. 9 is a top view showing another antenna according to an embodiment of the present disclosure.
Figure 10:
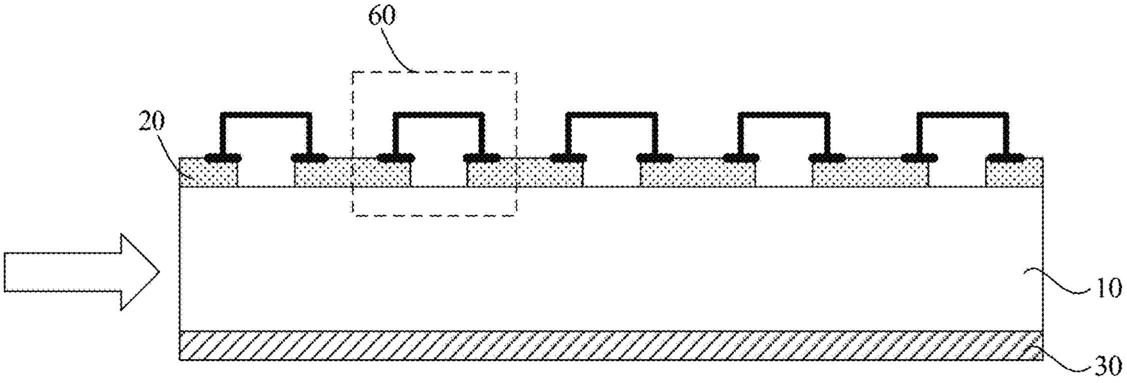
FIG. 10 is a side view of the antenna shown in FIG. 9.

In some examples, FIG. 9 is a top view showing another antenna according to an embodiment of the present disclosure, and FIG. 10 is a side view of the antenna shown in FIG. 9. As shown in FIGS. 9 and 10, the slits 21 of the antenna are arranged side by side on a straight line, and one switch unit 60 is arranged at a position corresponding to each of the slits 21. The antenna is a one-dimensional scanning antenna, and a feeding element 50 of the antenna may be arranged at each of the left and right sides of the antenna. The arrows shown in FIGS. 9 and 10 illustrate a configuration of feeding a microwave into the antenna from the left side. A turn-on state and a turn-off state of each switch unit 60 may be realized in the same manner as described above, thereby realizing the radiation and shielding of a microwave.

In some examples, each of the first shielding layer 30, the second shielding layer 70, the radiating layer 20, the first electrode 62, the second electrode 65, and the connecting portion 64 may be made of a material of metal, which in particular includes, but is not limited to, a low-resistance and low-loss metal such as copper, gold, silver, or the like, and may be manufactured by magnetron sputtering, thermal evaporation, electroplating, and/or the like.

In a second aspect, an embodiment of the present disclosure provides a communication apparatus, which includes the antenna according to any one of the foregoing embodiments. The communication apparatus can achieve the same advantages as those of the antenna, and detailed description thereof is omitted here.

It should be noted that the above embodiments are merely exemplary embodiments adopted to illustrate the principles of the present disclosure, and the present disclosure is not limited thereto. It will be apparent to one of ordinary skill in the art that various modifications and improvements may be made therein without departing from the spirit and scope of the present disclosure, and such modifications and improvements are also considered to fall within the scope of the present disclosure.

What is claimed is:

1. An antenna, comprising:

a dielectric layer having a first surface and a second surface opposite to each other in a thickness direction of the dielectric layer;

a radiating layer on the first surface of the dielectric layer, and having therein at least one slit;

a first shielding layer on the second surface of the dielectric layer, and being electrically connected to the radiating layer;

wherein the antenna further comprises:

a first insulating layer on a side of the radiating layer distal to the first surface of the dielectric layer;

at least one switch unit on a side of the first insulating layer distal to the dielectric layer, and being in one-to-one correspondence with the at least one slit; and each switch unit comprises: a first electrode, a second insulating layer, at least one connecting portion, and a second electrode that are sequentially arranged in a direction away from the first insulating layer, wherein an orthogonal projection of the first electrode on the dielectric layer and an orthogonal projection of the second electrode on the dielectric layer overlap each other; the at least one connecting portion is connected to the second electrode to form a certain gap between the second electrode and the first electrode; and the orthogonal projection of the second electrode on the dielectric layer and an orthogonal projection of a corresponding slit on the dielectric layer at least partially overlap each other.

2. The antenna according to claim 1, wherein the orthogonal projection of the second electrode on the dielectric layer covers a center of the orthogonal projection of the corresponding slit the dielectric layer.

3. The antenna according to claim 2, wherein the dielectric layer comprises a first sub-dielectric layer and a second sub-dielectric layer; a surface of the first sub-dielectric layer distal to the second sub-dielectric layer serves as the first surface of the dielectric layer; a surface of the second sub-dielectric layer distal to the first sub-dielectric layer serves as the second surface of the dielectric layer, the antenna further comprises a second shielding layer between the first sub-dielectric layer and the second sub-dielectric layer; and an edge of an orthogonal projection of the second shielding layer on the first sub-dielectric layer and a corresponding edge of an orthogonal projection of the first shielding layer on the first sub-dielectric layer have a certain distance therebetween.

4. The antenna according to claim 2, wherein the at least one slit comprises a plurality of slits, and the plurality of slits are arranged to form one of the following:

a spiral shape;

concentric circles; and a linear shape.

5. The antenna according to claim 2, further comprising a feeding element for feeding an electromagnetic wave signal into the dielectric layer; wherein a feeding point of the feeding element is at a center of the radiating layer.

6. The antenna according to claim 1, wherein the first electrode comprises a first sub-electrode and a second sub-electrode, and orthogonal projections of the first sub-electrode and the second sub-electrode on the dielectric layer are respectively on both sides, which are along a lengthwise direction of the orthogonal projection of the corresponding slit on the dielectric layer, of the orthogonal projection of the corresponding slit on the dielectric layer, and the at least one connecting portion is on a portion of the second insulating layer on at least one of the first sub-electrode and the second sub-electrode of each switch unit.

7. The antenna according to claim 6, wherein each switch unit comprises two connecting portions, the two connecting portions are respectively connected to two opposite ends of the second electrode in a lengthwise direction of the second electrode; and the lengthwise direction of the second electrode in each switch unit intersects with a lengthwise direction of the slit corresponding to the switch unit.

8. The antenna according to claim 7, wherein the dielectric layer comprises a first sub-dielectric layer and a second sub-dielectric layer; a surface of the first sub-dielectric layer distal to the second sub-dielectric layer serves as the first surface of the dielectric layer; a surface of the second sub-dielectric layer distal to the first sub-dielectric layer serves as the second surface of the dielectric layer, the antenna further comprises a second shielding layer between the first sub-dielectric layer and the second sub-dielectric layer; and an edge of an orthogonal projection of the second shielding layer on the first sub-dielectric layer and a corresponding edge of an orthogonal projection of the first shielding layer on the first sub-dielectric layer have a certain distance therebetween.

9. The antenna according to claim 7, wherein the at least one slit comprises a plurality of slits, and the plurality of slits are arranged to form one of the following:

a spiral shape;

concentric circles; and a linear shape.

10. The antenna according to claim 6, wherein each switch unit comprises one connecting portion connected to one end of the second electrode in a lengthwise direction of the second electrode; and the lengthwise direction of the second electrode in each switch unit intersects with a lengthwise direction of the slit corresponding to the switch unit.

11. The antenna according to claim 10, wherein the dielectric layer comprises a first sub-dielectric layer and a second sub-dielectric layer; a surface of the first sub-dielectric layer distal to the second sub-dielectric layer serves as the first surface of the dielectric layer; a surface of the second sub-dielectric layer distal to the first sub-dielectric layer serves as the second surface of the dielectric layer, the antenna further comprises a second shielding layer between the first sub-dielectric layer and the second sub-dielectric layer; and an edge of an orthogonal projection of the second shielding layer on the first sub-dielectric layer and a corresponding edge of an orthogonal projection of the first shielding layer on the first sub-dielectric layer have a certain distance therebetween.

12. The antenna according to claim 10, wherein the at least one slit comprises a plurality of slits, and the plurality of slits are arranged to form one of the following:

a spiral shape;

concentric circles; and a linear shape.

13. The antenna according to claim 6, wherein the dielectric layer comprises a first sub-dielectric layer and a second sub-dielectric layer; a surface of the first sub-dielectric layer distal to the second sub-dielectric layer serves as the first surface of the dielectric layer; a surface of the second sub-dielectric layer distal to the first sub-dielectric layer serves as the second surface of the dielectric layer, the antenna further comprises a second shielding layer between the first sub-dielectric layer and the second sub-dielectric layer; and an edge of an orthogonal projection of the second shielding layer on the first sub-dielectric layer and a corresponding edge of an orthogonal projection of the first shielding layer on the first sub-dielectric layer have a certain distance therebetween.

14. The antenna according to claim 6, wherein the at least one slit comprises a plurality of slits, and the plurality of slits are arranged to form one of the following:

a spiral shape;

concentric circles; and a linear shape.

15. The antenna according to claim 1, wherein the dielectric layer comprises a first sub-dielectric layer and a second sub-dielectric layer; a surface of the first sub-dielectric layer distal to the second sub-dielectric layer serves as the first surface of the dielectric layer; a surface of the second sub-dielectric layer distal to the first sub-dielectric layer serves as the second surface of the dielectric layer, the antenna further comprises a second shielding layer between the first sub-dielectric layer and the second sub-dielectric layer; and an edge of an orthogonal projection of the second shielding layer on the first sub-dielectric layer and a corresponding edge of an orthogonal projection of the first shielding layer on the first sub-dielectric layer have a certain distance therebetween.

16. The antenna according to claim 15, wherein an orthogonal projection of a center of the first shielding layer on the first sub-dielectric layer and an orthogonal projection of a center of the second shielding layer on the first sub-dielectric layer overlap each other.

17. The antenna according to claim 1, wherein the at least one slit comprises a plurality of slits, and the plurality of slits are arranged to form one of the following:

a spiral shape;

concentric circles; and a linear shape.

18. The antenna according to claim 1, further comprising a feeding element for feeding an electromagnetic wave signal into the dielectric layer; wherein a feeding point of the feeding element is at a center of the radiating layer.

19. The antenna according to claim 1, wherein the dielectric layer comprises a material of glass.

20. A communication apparatus, comprising the antenna according to claim 1.

* * * * *